(12) United States Patent
Im et al.

(10) Patent No.: US 10,663,780 B2
(45) Date of Patent: May 26, 2020

(54) LIQUID CRYSTAL BARRIER

(71) Applicant: LG Display Co., Ltd., Seoul (KR)

(72) Inventors: Hee-Jin Im, Gyeonggi-do (KR);
Seung-Man Ryu, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 35 days.

(21) Appl. No.: 15/638,816

(22) Filed: Jun. 30, 2017

(65) Prior Publication Data
US 2018/0004019 A1   Jan. 4, 2018

(30) Foreign Application Priority Data

Jun. 30, 2016   (KR) .................. 10-2016-0082388

(51) Int. Cl.
*G02F 1/1333* (2006.01)
*H01L 51/50* (2006.01)
(Continued)

(52) U.S. Cl.
CPC ........... *G02F 1/1333* (2013.01); *G02B 30/26* (2020.01); *G02B 30/31* (2020.01); *G02F 1/1323* (2013.01); *G02F 1/1345* (2013.01); *G02F 1/13452* (2013.01); *G02F 1/29* (2013.01); *H01L 51/50* (2013.01); *H04N 13/111* (2018.05); *H04N 13/261* (2018.05); *H04N 13/275* (2018.05);
(Continued)

(58) Field of Classification Search
CPC .................................................. G02B 27/2214
See application file for complete search history.

(56) References Cited

U.S. PATENT DOCUMENTS

2011/0304571 A1*  12/2011  Kim .................... G02F 1/13338
                                                        345/173
2016/0195731 A1*   7/2016  Murao ................. G02F 1/1347
                                                        349/15
(Continued)

FOREIGN PATENT DOCUMENTS

KR   10-2010-0009739 A    1/2010
KR   10-2012-0070363 A    6/2012
(Continued)

OTHER PUBLICATIONS

Office Action issued in counterpart Korean Patent Application No. 10-2016-0082388 dated Jun. 16, 2017.

*Primary Examiner* — Alexander P Gross
(74) *Attorney, Agent, or Firm* — Morgan, Lewis & Bockius LLP (57) ABSTRACT

A liquid crystal barrier is configured to determine the viewing position of a viewer and selectively adjust based on the viewing position of the viewer. The liquid crystal barrier includes a barrier panel and a driving voltage supply unit. The barrier panel includes first electrodes, second electrodes, and liquid crystal layer. Opposite ends of the first electrodes are connected between 2n first channel lines, which form n channels, on a lower substrate. Opposite ends of the second electrodes are connected between 2n second channel lines, which form n channels, on an upper substrate. The liquid crystal layer is filled between the upper and lower substrates. The driving voltage supply unit is configured to supply at least one of a driving voltage and a common voltage to at least one of the first electrodes and the second electrodes.

15 Claims, 9 Drawing Sheets

(51) Int. Cl.

| | |
|---|---|
| *H04N 13/111* | (2018.01) |
| *H04N 13/261* | (2018.01) |
| *H04N 13/275* | (2018.01) |
| *H04N 13/31* | (2018.01) |
| *G02F 1/13* | (2006.01) |
| *G02F 1/1345* | (2006.01) |
| *G02F 1/29* | (2006.01) |
| *G02B 30/31* | (2020.01) |
| *G02B 30/26* | (2020.01) |

(52) U.S. Cl.
CPC ....... *H04N 13/31* (2018.05); *G02F 2001/291* (2013.01)

(56) References Cited

U.S. PATENT DOCUMENTS

| | | | |
|---|---|---|---|
| 2017/0045763 A1* | 2/2017 | Murao | G02B 27/22 |
| 2017/0219836 A1* | 8/2017 | Hyodo | G02B 27/2214 |
| 2017/0248829 A1* | 8/2017 | Koito | G02F 1/29 |
| 2017/0309644 A1* | 10/2017 | Yeh | H01L 27/124 |

FOREIGN PATENT DOCUMENTS

| | | |
|---|---|---|
| KR | 10-2013-0131692 A | 12/2013 |
| KR | 10-1362160 B1 | 2/2014 |

\* cited by examiner

LIQUID CRYSTAL BARRIER

This application claims the benefit of Korean Patent Application No. 10-2016-0082388, filed on Jun. 30, 2016, which is hereby incorporated by reference as if fully set forth herein.

BACKGROUND

Technical Field

The present invention relates to a liquid crystal barrier, and more particularly, to a liquid crystal barrier that is capable of selectively adjusting the viewing distance of a stereoscopic image display device.

Discussion of the Related Art

Various stereoscopic image display devices using binocular parallax have been proposed and researched. Typically, a stereoscopic image display device uses a lenticular lens or a parallax barrier.

A stereoscopic image display device using a parallax barrier is configured such that vertical slits, each of which has a thin striped pattern, for transmitting or blocking light are arranged at predetermined intervals and such that left and right images are alternately disposed in front of or behind the vertical slits at predetermined intervals. When images are viewed through the slits at a specific time, therefore, left and right images are accurately divided from each other geometrically and optically so that a stereoscopic image can be achieved without glasses. The parallax barrier may be a liquid crystal barrier, in which an electric field is generated by an electrical signal to rotate liquid crystal molecules, thereby entirely transmitting or blocking light.

In a stereoscopic image display device of the related art using a liquid crystal barrier, the liquid crystal barrier is disposed in front of or behind a display panel to be spaced apart from the display panel by a predetermined distance. The display panel is configured such that images divided into a plurality of viewpoints (hereinafter, referred to as "views") are alternately arranged having a pixel pitch, and the liquid crystal barrier is configured such that transparent regions and opaque regions are alternately arranged having a barrier pitch. Light from the display panel or a light source provided at the rear surface of the display panel reaches the two eyes of a viewer through the transparent regions of the liquid crystal barrier. As a result, information about different two-dimensional images is input to the left and right eyes of the viewer, whereby the viewer obtains information about an image having a cubic effect.

In the stereoscopic image display device using a liquid crystal barrier, a stereoscopic image can be viewed only within a predetermined range of distances from an optical viewing distance OVD. In the stereoscopic image display device of the related art using the liquid crystal barrier, therefore, it is not possible for a user to optionally adjust the viewing distance, like a vehicle interior screen. In addition, if the viewing distance of the viewer changes depending on viewing conditions, it is difficult to use the stereoscopic image display device using the liquid crystal barrier.

SUMMARY

Accordingly, embodiments of the present disclosure are directed to a liquid crystal barrier that substantially obviates one or more of the problems due to limitations and disadvantages of the related art.

An object of the present disclosure is to provide a liquid crystal barrier that is capable of determining the viewing position of a viewer and selectively providing an optimal viewing distance based on the viewing position of the viewer.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal barrier comprises a barrier panel and a driving voltage supply. The barrier panel comprises a lower substrate; an upper substrate opposite to the lower substrate; a plurality of first electrodes, opposite ends of each of which are connected to a respective one of a pair of first channel lines selected from among 2n (n being a natural number) first channel lines provided on edges of opposite sides of the lower substrate, wherein a first n of the of the 2n first channel lines are located on an edge of one side of the lower substrate and a second n of the of the 2n first channel lines are located on an edge of the other side of the lower substrate; a plurality of second electrodes, opposite ends of each of which are connected to a respective on of a pair of second channel lines selected from among 2n second channel lines provided on edges of opposite sides of the upper substrate, wherein a first n of the 2n second channel lines are located on an edge of one side of the upper substrate and a second n of the 2n second channel lines are located on an edge of the other side of the upper substrate; and a liquid crystal layer filled between the lower substrate and the upper substrate. The driving voltage supply is configured to supply a driving voltage or a common voltage to the first electrodes and the second electrodes, to supply the driving voltage to the first electrodes and the common voltage to the second electrodes, or to supply the driving voltage to the second electrodes and the common voltage to the first electrodes.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Reference will now be made in detail to embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may obscure the subject matter of the present invention. In addition, the terms used in the following description are selected in consideration of ease of preparation of the specification, and may be different from the names of parts constituting an actual product.

Shapes, sizes, rates, angles, and numbers shown in the drawings to describe the embodiments of the present invention are illustrative and thus are not limitative of the disclosure of the present invention.

Figure 1A:
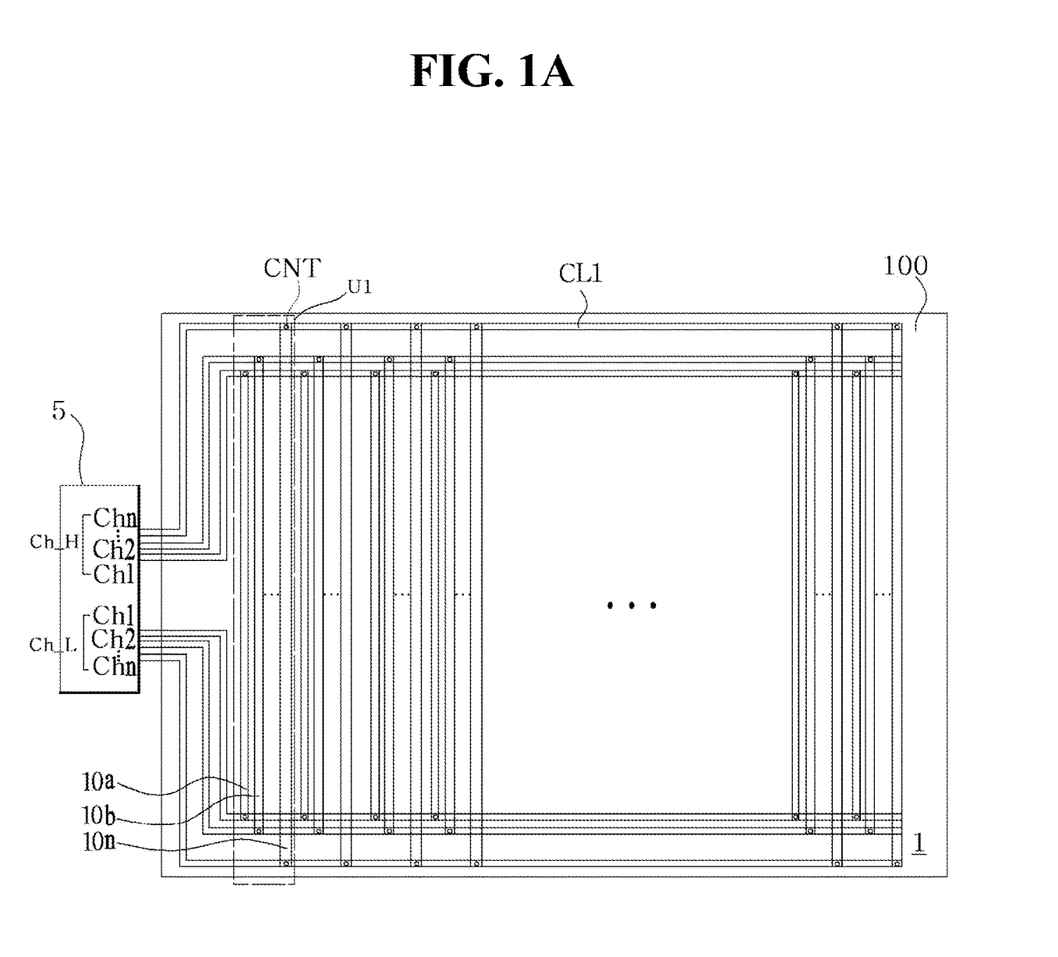
FIGS. 1A and 1B are plan views illustrating a liquid crystal barrier according to an example embodiment of the present invention.
Figure 1B:
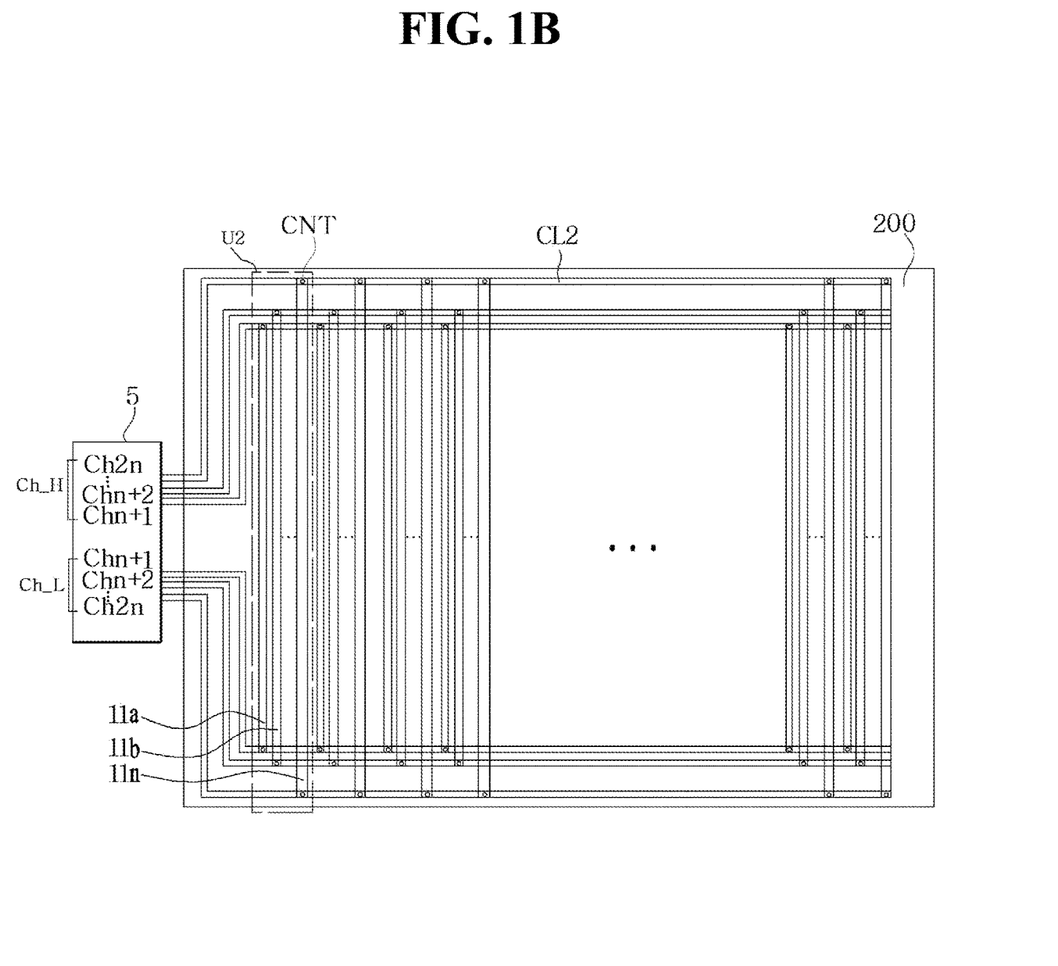
Figure 2:
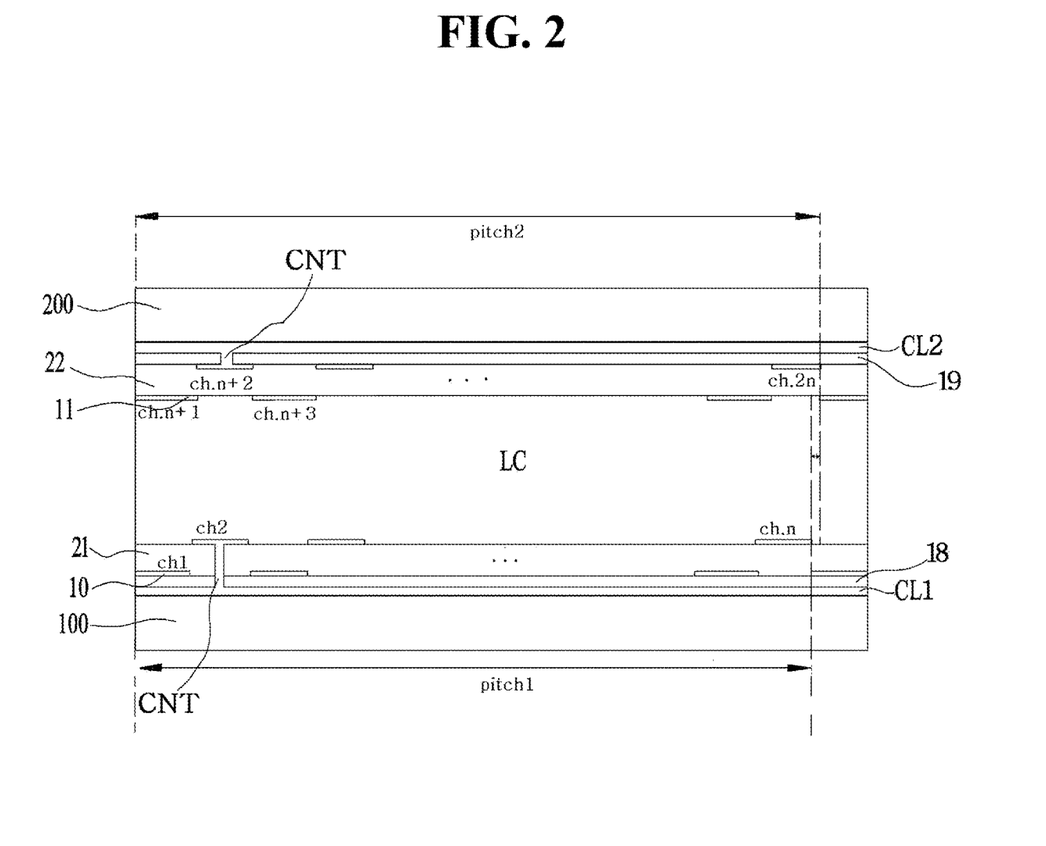
FIG. 2 is a sectional view illustrating the liquid crystal barrier according to an example embodiment of the present invention.

FIGS. 1A and 1B are plan views illustrating a liquid crystal barrier according to an example embodiment of the present invention, and FIG. 2 is a sectional view illustrating the liquid crystal barrier according to an example embodiment of the present invention.

As shown in FIGS. 1A and 1B, the liquid crystal barrier may include a barrier panel 1 and a driving voltage supply unit 5. The barrier panel 1 has a structure in which a lower substrate 100 and an upper substrate 200 are laminated. A liquid crystal LC is filled between the lower substrate 100 and the upper substrate 200. The driving voltage supply unit 5 supplies a driving voltage to the barrier panel 1 via 2n channels Ch1 to Ch2n.

With reference to FIGS. 1A, 1B, and 2, the barrier panel 1 has a structure in which the lower substrate 100 and the upper substrate 200 are laminated facing each other. The liquid crystal barrier may include a plurality of first channel lines CL1 and a plurality of first electrodes 10 located on the lower substrate 100 and a plurality of second channel lines CL2 and a plurality of second electrodes 11 located on the upper substrate 200. The first electrodes 10a to 10n may be formed on a first dielectric film 18 provided at the lower substrate 100, and the second electrodes 11a to 11n may be formed on a second dielectric film 19 provided at the upper substrate 200. As described above, the lower substrate 100 and the upper substrate 200 are laminated facing each other. In the final barrier panel 1, therefore, the second channel lines CL2 are located under the upper substrate 200, the second dielectric film 19 is located covering the second channel lines CL2, and the second electrodes 11a to 11n are located under the second dielectric film 19. The first electrodes 10a to 10n and the second electrodes 11a to 11n may be formed of a transparent conductive material, such as ITO, IZO, or ZnO. The first channel lines CL1 and the second channel lines CL2 may be formed of a metal material, such as Ag, Au, Cu, Al, or Mo, or a transparent conductive material, such as ITO, IZO, or ZnO.

The first electrodes 10a to 10n and the second electrodes 11a to 11n may be formed over at least two layers. Specifically, some of the first electrodes 10a to 10n may be directly located on the first dielectric film 18, a first passivation layer 21 may be located covering the some first electrodes, and the other first electrodes may be located on the first passivation layer 21. Each of the first electrodes 10a to 10n and an adjacent one of the first electrodes 10a to 10n may be located on different layers.

For example, as shown in FIG. 2, odd-numbered ones of the first electrodes may be located on the first dielectric film 18, the first passivation layer 21 may be located covering the odd-numbered ones of the first electrodes, and even-numbered ones of the first electrodes may be located on the first passivation layer 21. In other words, the odd-numbered ones and the even-numbered ones of the first electrodes 10a to 10n may be spaced apart from each other in the state in which the first passivation layer 21 is located therebetween.

In addition, the first electrodes 10a to 10n may be formed over three layers.

Figure 3:
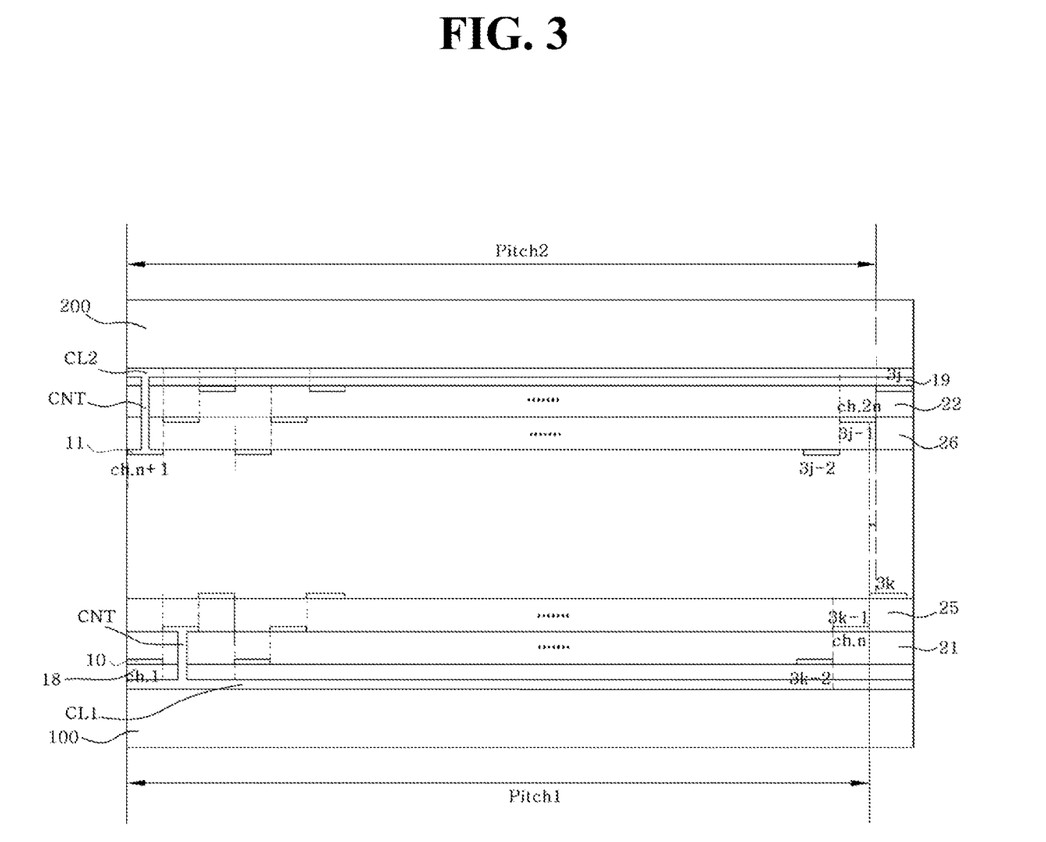
FIG. 3 is a sectional view illustrating a liquid crystal barrier according to an example embodiment of the present invention having a structure in which first electrodes and second electrodes are formed in three layers.

FIG. 3 is a sectional view illustrating a liquid crystal barrier according to an example embodiment of the present invention having a structure in which first electrodes and second electrodes are formed in three layers.

As shown in FIG. 3, (3k−2)-th (k being a natural number) first electrodes may be located on the first dielectric film 18, the first passivation layer 21 may be located covering the (3k−2)-th first electrodes, (3k−1)-th first electrodes may be located on the first passivation layer 21, a third passivation layer 25 may be located covering the (3k−1)-th first electrodes, and 3k-th first electrodes may be located on the third passivation layer 25. In other words, the (3k−2)-th first electrodes may be located between the lower substrate 100 and the first passivation layer 21, the (3k−1)-th first electrodes may be located between the first passivation layer 21 and the third passivation layer 25, and the 3k-th first electrodes may be located on the third passivation layer 25.

In the same manner, some of the second electrodes 11a to 11n may be directly located under a second dielectric film 19, a second passivation layer 22 may be located covering the some of the second electrodes, and the other second electrodes may be located under the second passivation layer 22. Each of the second electrodes 11a to 11n and an adjacent one of the second electrodes 11a to 11n may be located on different layers.

For example, as shown in FIG. 2, odd-numbered ones of the second electrodes may be located under the second dielectric film 19, the second passivation layer 22 may be located covering the odd-numbered ones of the second electrodes, and even-numbered ones of the second electrodes may be located under the second passivation layer 22. In other words, the odd-numbered ones and the even-numbered ones of the second electrodes 11a to 11n may be spaced apart from each other in the state in which the second passivation layer 22 is located therebetween.

In addition, the second electrodes 11a to 11n may be formed over three layers. For example, as shown in FIG. 3, (3j−2)-th (j being a natural number) second electrodes may be located under the second dielectric film 11, the second passivation layer 22 may be located so as to cover the (3j−2)-th second electrodes, (3j−1)-th second electrodes may be located under the second passivation layer 22, a fourth passivation layer 26 may be located covering the (3j−1)-th second electrodes, and 3j-th second electrodes may be located under the fourth passivation layer 26. In other words, the (3j−2)-th second electrodes may be located between the upper substrate 200 and the second passivation layer 22, the (3j−1)-th second electrodes may be located between the second passivation layer 22 and the fourth passivation layer 26, and the 3j-th second electrodes may be located under the fourth passivation layer 26.

Because the first electrodes 10a to 10n and the second electrodes 11a to 11n are formed over a plurality of layers, as described above, the horizontal distance between the respective first electrodes 10a to 10n and between the respective second electrodes 11a to 11n may be minimized.

Particularly, if the first electrodes 10a to 10n and the second electrodes 11a to 11n are formed over three layers, the line width and line distance of the first electrodes 10a to 10n and the second electrodes 11a to 11n are reduced, with the result that the number of first electrodes 10a to 10n and second electrodes 11a to 11n is increased. If the number of electrodes is increased, as described above, a freedom in design can be increased to accurately obtain the optimal viewing distance through adjustment of the distance and minute pitch between the first electrodes and the second electrodes, thereby realizing a barrier optimized for viewers' demands.

2n (n being a natural number) first channel lines CL1 are provided on the edges of the opposite sides of the lower substrate 100. n first channel lines CL1 are provided on one side of the lower substrate 100, and n first channel lines CL1 are provided on the other side of the lower substrate 100.

The first electrodes 10a to 10n are connected between the first channel lines CL1 located on different sides. That is, the opposite ends of each of the first electrodes 10a to 10n are connected between two first channel lines CL1 located on the edges of the opposite sides of the lower substrate 100.

2n (n being a natural number) second channel lines CL2 are provided on the edges of the opposite sides of the upper substrate 200. n second channel lines CL2 are provided on one side of the upper substrate 200, and n second channel lines CL2 are provided on the other side of the upper substrate 200.

The second electrodes 11a to 11n are connected between the second channel lines CL2 located on different sides. That is, the opposite ends of each of the second electrodes 11a to 11n are connected between two second channel lines CL2 located on the edges of the opposite sides of the upper substrate 200.

The driving voltage supply unit 5 includes 2n channels Ch1 to Ch2n. Each channel includes a high-potential driving voltage terminal Ch_H and a low-potential driving voltage terminal Ch_L. n first channel lines CL1 located on the edge of one side of the lower substrate 100 are connected to high-potential driving voltage terminals Ch_H of n different channels, for example from a first channel to an n-th channel, provided at the driving voltage supply unit 5.

In addition, n first channel lines CL1 located on the edge of the other side of the lower substrate 100 are connected to low-potential driving voltage terminals Ch_L of the n different channels, for example from the first channel to the n-th channel, provided at the driving voltage supply unit 5. The low-potential driving voltage terminals Ch_L may constitute a single ground electrode.

In the same manner, n second channel lines CL2 located on the edge of one side of the upper substrate 200 are connected to high-potential driving voltage terminals Ch_H of n different channels, for example from an (n+1)-th channel to a 2n-th channel, provided at the driving voltage supply unit 5. In addition, n second channel lines CL2 located on the edge of the other side of the upper substrate 200 are connected to low-potential driving voltage terminals Ch_L of the n different channels, for example from the (n+1)-th channel to the 2n-th channel, provided at the driving voltage supply unit 5. The low-potential driving voltage terminals Ch_L may constitute a single ground electrode.

For the sake of convenience, the first electrodes 10a to 10n may be divided into a plurality of first unit electrode groups U1. Each first unit electrode group includes n first electrodes 10a to 10n. The n first electrodes 10a to 10n belonging to the first unit electrode group are connected between different first channel lines CL1. Specifically, the n first electrodes 10a to 10n belonging to the first unit electrode group are sequentially connected to first channel lines CL1 connected to the first channel to the n-th channel of the driving voltage supply unit 5. As a result, the first electrodes 10a to 10n are sequentially connected to the first channel to the n-th channel of the driving voltage supply unit 5 via the first channel lines CL1.

In the same manner, the second electrodes 11a to 11n may be divided into a plurality of second unit electrode groups U2. Each second unit electrode group includes n second electrodes 11a to 11n. The n second electrodes 11a to 11n belonging to the second unit electrode group are connected between different second channel lines CL2. Specifically, the n second electrodes 11a to 11n belonging to the second unit electrode group are sequentially connected to second channel lines CL2 connected to the (n+1)-th channel to the 2n-th channel of the driving voltage supply unit 5. As a result, the second electrodes 11a to 11n are sequentially connected to the (n+1)-th channel to the 2n-th channel of the driving voltage supply unit 5 via the second channel lines CL2. In this way, the first electrodes 10a to 10n of the first unit electrode group U1 and the second electrodes 11a to 11n of the second unit electrode group U2 are sequentially connected to respective channels to supply different driving voltages to the respective channels.

The first electrodes 10a to 10n and the first channel lines CL1 are connected to each other via a first contact hole CNT1. In the same manner, the second electrodes 11a to 11n and the second channel lines CL2 are connected to each other via a second contact hole CNT2.

Figure 4A:
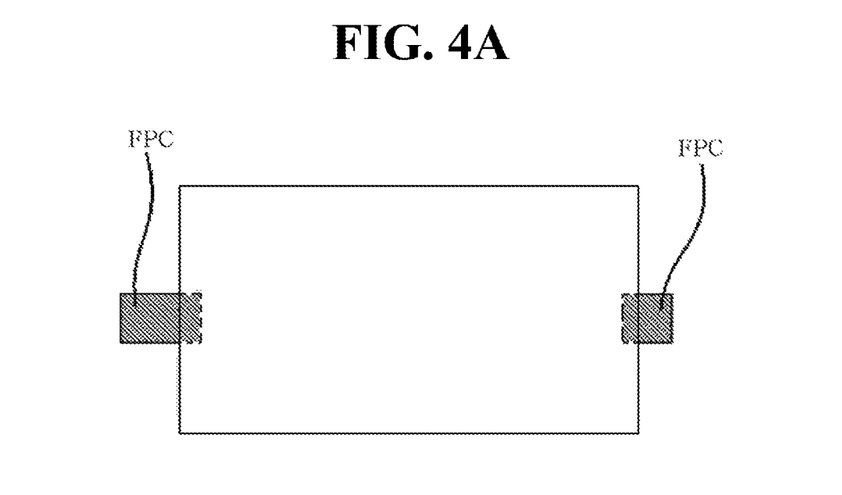
FIGS. 4A, 4B, 5A, and 5B are schematic views illustrating a structure for supplying a driving voltage to channel lines in the liquid crystal barrier according to an example embodiment of the present invention.
Figure 4B:
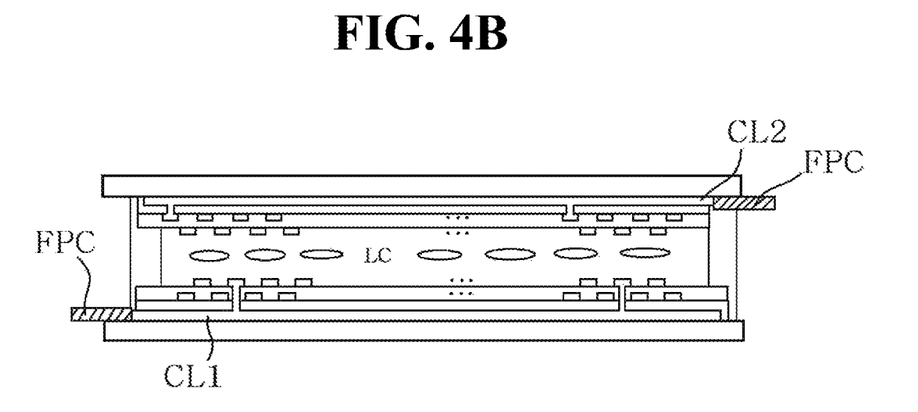

FIGS. 4A, 4B, 5A, and 5B are schematic views illustrating a structure for supplying a driving voltage to channel lines in the liquid crystal barrier according to an example embodiment of the present invention;

FIG. 4 shows a structure in which the first channel lines CL1 on the lower substrate 100 and the second channel lines CL2 on the upper substrate 200 are connected to the driving voltage supply unit 5 via separate flexible printed circuit boards (FPCs). The first channel lines CL1 on the lower substrate 100 and the second channel lines CL2 on the upper substrate 200 may be connected to different flexible printed circuit boards (FPCs). Although not shown, the flexible printed circuit boards (FPCs) may be connected to the driving voltage supply unit 5 to supply a driving voltage or a common voltage to the first channel lines CL1 and the second channel lines CL2.

Figure 5A:
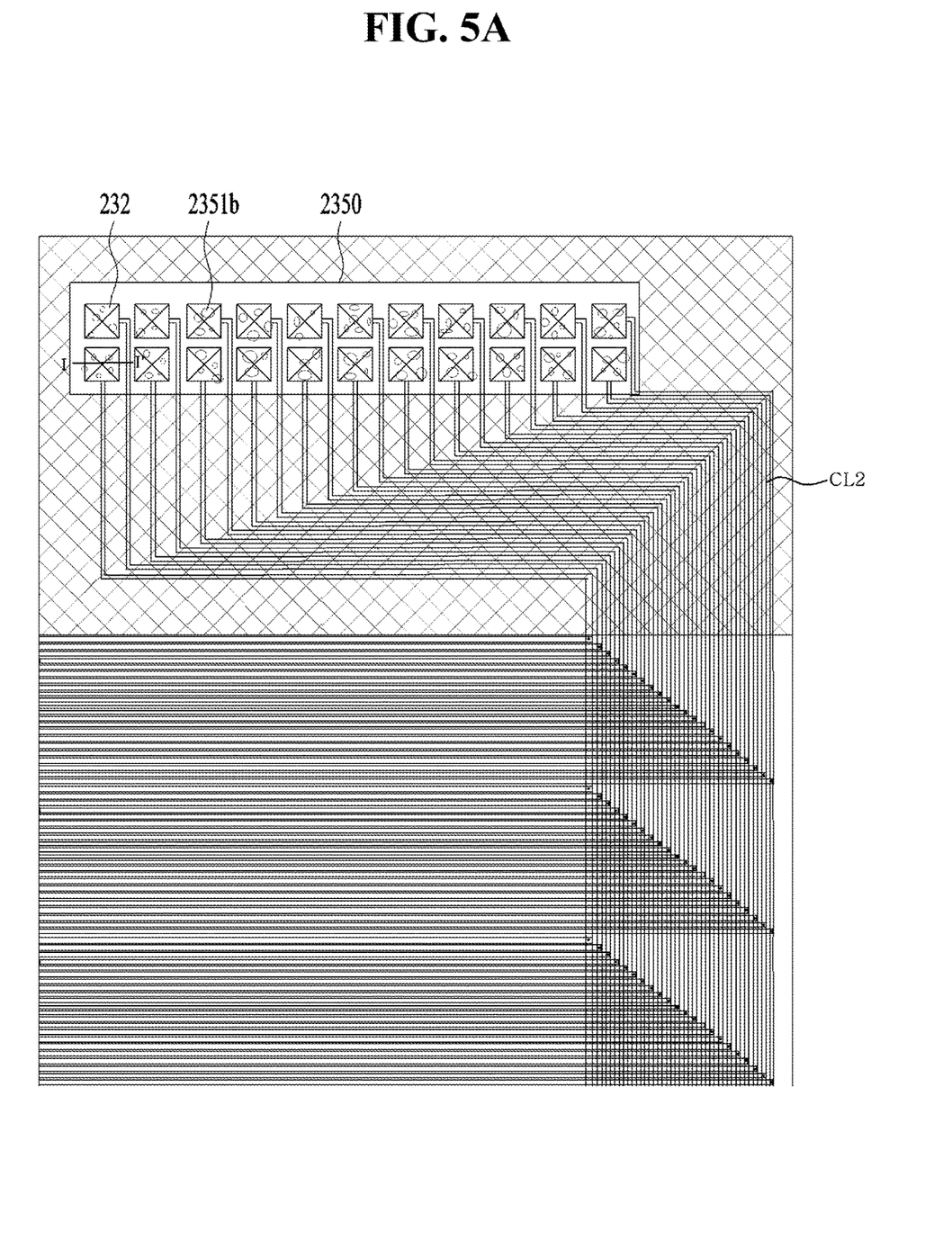
Figure 5B:
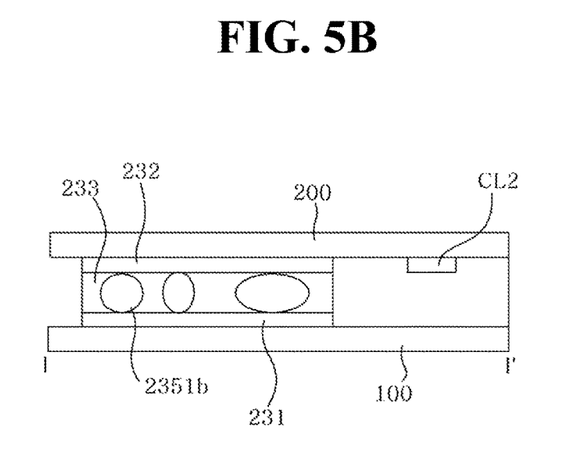

FIG. 5A is a view showing a structure in which the second channel lines CL2 on the upper substrate 200 are connected to the lower substrate 100 via a pad unit 2350 and conductive balls, and FIG. 5B is a sectional view taken along line I-I' of FIG. 5A. As shown in FIG. 5A, a pad unit 2350 including a plurality of pad electrodes 232 may be formed to electrically connect the upper substrate 200 to the driving voltage supply unit 5.

With reference to FIG. 5B, a pad electrode 232 is located under the upper substrate 200, i.e., on the inner surface of the upper substrate 200. A dummy electrode 231 is provided on the lower substrate 100. The dummy electrode 231 and the pad electrode 232 are laminated by a seal 233 including a conductive ball 2351b. The dummy electrode 231 and the pad electrode 232 are electrically connected to each other via the conductive ball 2351b. Although not shown in FIG. 5, the dummy electrode 231 is connected to the flexible printed circuit board (FPC), shown in FIG. 4, via a separate wire (not shown). The flexible printed circuit board (FPC) is connected to the driving voltage supply unit 5. The second channel lines CL2 are connected to the pad electrodes 232. The driving voltage supply unit 5 supplies a driving voltage or a common voltage to the second channel lines CL2 via the flexible printed circuit board (FPC) and the pad unit 2350.

The driving voltage supply unit 5 supplies a driving voltage or a common voltage to the first electrodes 10a to 10n and the second electrodes 11a to 11n. When the driving voltage is supplied to the first electrodes 10a to 10n, the common voltage is supplied to the second electrodes 11a to 11n. When the driving voltage is supplied to the second electrodes 11a to 11n, the common voltage is supplied to the first electrodes 10a to 10n. Consequently, an electric field is generated between the first electrodes 10a to 10n and the second electrodes 11a to 11n of the barrier panel 1 due to the potential difference between the driving voltage and the common voltage. As a result, the liquid crystal molecules disposed between the lower substrate 100 and the upper substrate 200 are rotated so that light is selectively transmitted.

Meanwhile, as shown in FIGS. 2 and 3, the liquid crystal barrier is configured such that the horizontal pitch pitch1 of the first unit electrode group U1 constituted by the first electrodes 10a to 10n and the horizontal pitch pitch2 of the second unit electrode group U2 constituted by the second electrodes 11a to 11n are different from each other. For example, the difference between the horizontal pitch pitch1 of the first unit electrode group U1 and the horizontal pitch pitch2 of the second unit electrode group U2 may be about 0.01 to 0.1 μm.

To this end, the first unit electrode group U1 and the second unit electrode group U2 may be formed at the same pitch, and the distance between the last first electrode and the preceding first electrode belonging to the first unit electrode group U1 may be increased. In addition, the difference in distance between the first electrodes 10a to 10n belonging to the first unit electrode group U1 and the second electrodes 11a to 11n belonging to the second unit electrode group U2 may be uniform.

Because the first unit electrode group U1 and the second unit electrode group U2 have different horizontal pitches, as described above, the first electrodes 10a to 10n on the lower substrate 100 and the second electrodes 11a to 11n on the upper substrate 200 may not be aligned with each other in the vertical direction but may be shifted to the left or the right relative to each other in the vertical direction.

When the first unit electrode group U1 and the second unit electrode group U2 have different horizontal pitches, as described above, the shading region of the barrier formed when the driving voltage is supplied to the first electrodes 10a to 10n and the common voltage is supplied to the second electrodes 11a to 11n is different in position from the shading region of the barrier formed when the driving voltage is supplied to the second electrodes 11a to 11n and the common voltage is supplied to the first electrodes 10a to 10n. When the position of the shading region is changed, as described above, the viewing distance of the liquid crystal barrier according to the present invention is changed, as shown in FIG. 7B.

The correlation between the horizontal pitch of the unit electrode group and the viewing distance is represented by Equation 1.

$$D = \frac{S \times N \times P}{n \times (N \times P - B_p)} \quad \text{[Equation 1]}$$

where D is the viewing distance of a stereoscopic image display device, S is the distance between a display panel and the liquid crystal barrier, N is the number of views of an image (i.e., the number into which an image displayed on the display panel is divided so as to have a plurality of viewpoints), P is the horizontal pitch of a sub-pixel provided at the display panel, n is a refractive index, and $B_p$ is the horizontal pitch of the unit electrode group to which the driving voltage is supplied, i.e., the first electrodes 10a to 10n or the second electrodes 11a to 11n.

According to Equation 1, when the horizontal pitch of the unit electrode group of the liquid crystal barrier is increased, the value of the denominator is decreased. As a result, the viewing distance of the stereoscopic image display device is increased. When the horizontal pitch of the unit electrode group of the liquid crystal barrier is decreased, the value of the denominator is increased. As a result, the viewing distance of the stereoscopic image display device is decreased.

As described above, the stereoscopic image display device, to which the liquid crystal barrier is applied, has different viewing distances when a driving voltage is applied to the first electrodes 10a to 10n and when a driving voltage is applied to the second electrodes 11a to 11n. When the viewing distance of a viewer is changed, therefore, the stereoscopic image display device changes the position of the shading region of the liquid crystal barrier as described above to display a stereoscopic image corresponding to the changed viewing distance.

Figure 6:
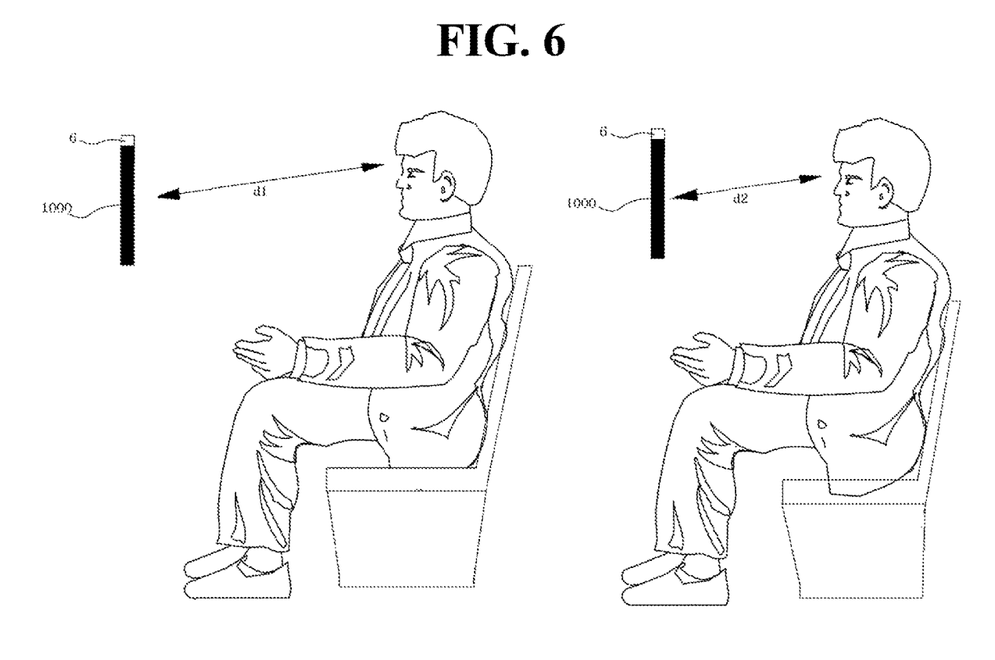
FIG. 6 is a view illustrating a stereoscopic image display device to which a liquid crystal barrier including a sensing unit according to an example embodiment of the present invention is applied.

FIG. 6 is a view illustrating a stereoscopic image display device to which a liquid crystal barrier including a sensing unit 6 according to an example embodiment of the present invention is applied.

The liquid crystal barrier according to the embodiment further includes a sensing unit 6 for sensing the position of a viewer. The sensing unit senses the position of the viewer such that the driving voltage supply unit 5 is controlled in order to change the position of the shading region of the liquid crystal barrier.

To this end, the sensing unit 6 may include a sensing device, such as a camera, which is integrated with or built in a display panel 1000 in which the liquid crystal barrier is mounted. The sensing unit 5 senses the position of a seat on which the viewer sits to sense the position of the viewer, and transmits information about the position of the viewer to the driving voltage supply unit 5.

The driving voltage supply unit 5 receives information about the position of the viewer from the sensing unit. When the viewer is at a first position, the driving voltage supply unit 5 supplies a driving voltage to the first electrodes 10a to 10n and supplies a common voltage to the second electrodes 11a to 11n. When the viewer is at a second position, the driving voltage supply unit 5 supplies a driving voltage to the second electrodes 11a to 11n and supplies a common voltage to the first electrodes 10a to 10n. The distance between the viewer at the first position and the display panel 1000 corresponds to a first viewing distance d1, and the distance between the viewer at the second position and the display panel 1000 corresponds to a second viewing distance d2.

Consequently, the liquid crystal barrier may be configured to have the first viewing distance d1 optimized when the viewer is at the first position and the second viewing distance d2 optimized when the viewer is at the second position.

Figure 7A:
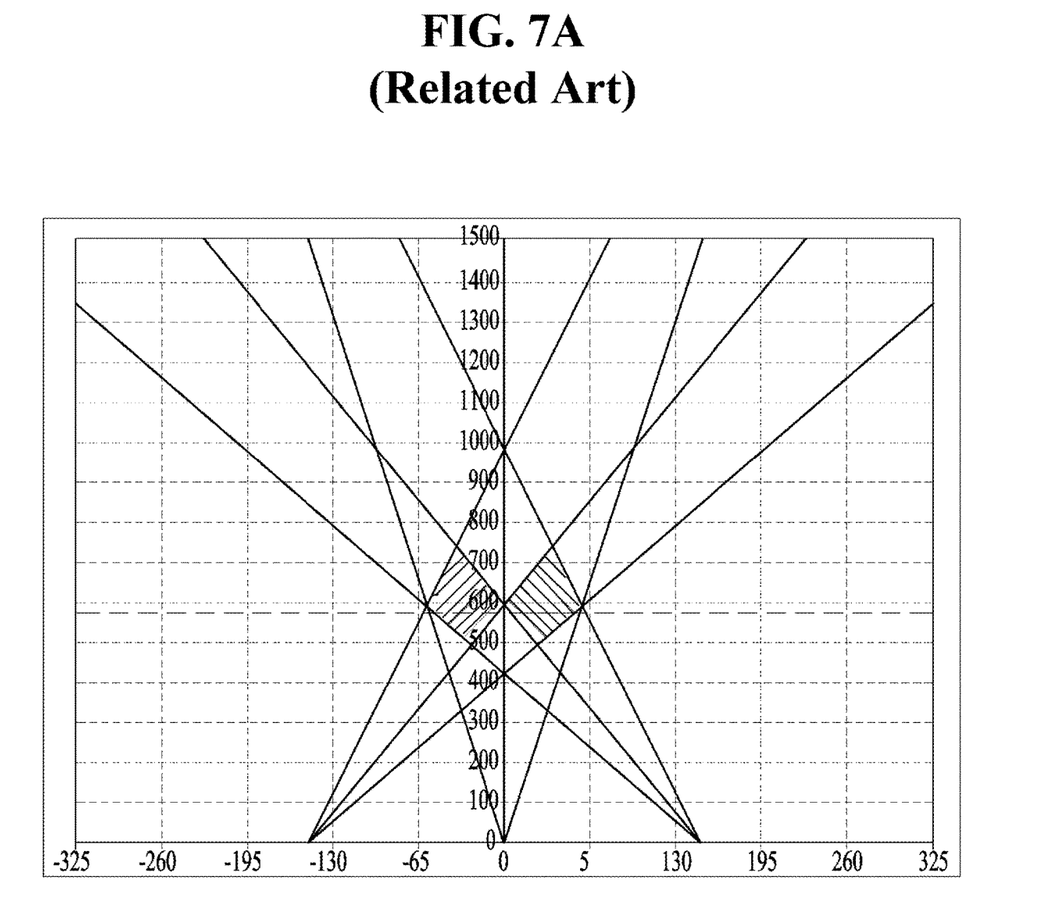
FIGS. 7A and 7B are views illustrating the viewing distance of the related art and the improvement of the viewing distance of the stereoscopic image display device to which the liquid crystal barrier according to an example embodiment of the present invention is applied.
Figure 7B:
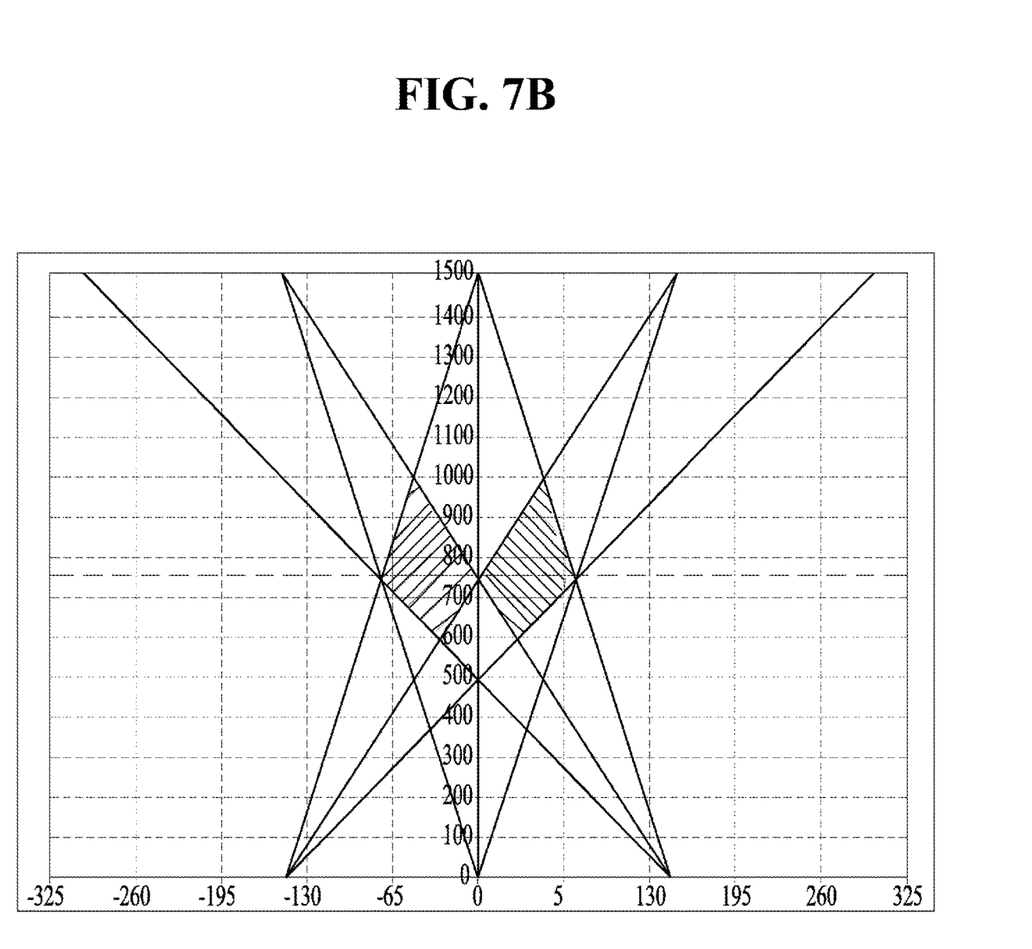

FIGS. 7A and 7B are views illustrating the viewing distance of the related art and the improvement of the viewing distance in experimental examples of the stereoscopic image display device to which the liquid crystal barrier according to an example embodiment of the present invention is applied.

In the experimental examples, the liquid crystal barrier had 20 channels. In addition, the horizontal pitch of the first unit electrode group was about 0.02 μm greater than the horizontal pitch of the second unit electrode group.

To obtain the optimal viewing distance corresponding to d1 (e.g., 90 mm) of FIG. 6, a driving voltage of 5 V was supplied to the first to fifth channels and the seventeenth to twentieth channels on the lower substrate, a driving voltage of 2.5 V was supplied to the sixth channel and the sixteenth channel on the lower substrate, a driving voltage of 0 V was supplied to the other channels on the lower substrate, and a common voltage of 0 V was supplied to the channels on the upper substrate. To obtain the optimal viewing distance corresponding to d2 (e.g., 70 mm) of FIG. 6, a driving voltage of 5 V was supplied to the first to fifth channels and the seventeenth to twentieth channels on the upper substrate, a driving voltage of 2.5 V was supplied to the sixth channel and the sixteenth channel on the upper substrate, a driving voltage of 0 V was supplied to the other channels on the upper substrate, and a common voltage of 0 V was supplied to the channels on the lower substrate.

In FIGS. 7A and 7B, the hatched regions correspond to viewable regions. As shown in FIG. 7A, a stereoscopic image display device to which a related art liquid crystal barrier is applied has a viewing distance of 400 to 700 mm. As a result, it is difficult to obtain both of the optimal viewing distances corresponding to d1 and d2. In contrast, as shown in FIG. 7B, the stereoscopic image display device to which the liquid crystal barrier according to an example embodiment of the present invention is applied may be configured to have a viewing distance of 600 to 1000 mm.

As is apparent from the above description, the stereoscopic image display device, having the liquid crystal barrier according to example embodiments of the present invention, selectively realizes a barrier having a viewing distance optimized depending on the position of a viewer. Thus, the viewing distance of the stereoscopic image display device is greatly increased.

It will be apparent to those skilled in the art that various modifications and variations can be made in the liquid crystal barrier of the present disclosure without departing from the technical idea or scope of the disclosure. Thus, it is intended that the present disclosure cover the modifications and variations of this disclosure provided they come within the scope of the appended claims and their equivalents.

What is claimed is:

1. A stereoscopic image display device, comprising:
   a display panel; and
   a liquid crystal barrier adjacent to the display panel, the liquid crystal barrier comprising:
   a lower substrate;
   an upper substrate opposite to the lower substrate;
   n first high-potential driving voltage channel lines located on an edge of a first side of the lower substrate;
   n first low-potential driving voltage channel lines located on an edge of a second side of the lower substrate, the second side opposite to the first side;
   a plurality of first electrodes, opposite ends of each of which are connected to a respective one of a pair of the n first high-potential driving voltage channel lines and the n first low-potential driving voltage channel lines;
   n second high-potential driving voltage channel lines located on an edge of a first side of the upper substrate;
   n second low-potential driving voltage channel lines located on an edge of a second side of the upper substrate, the second side opposite to the first side;
   a plurality of second electrodes, opposite ends of each of which are connected to a respective one of a pair of the n second high-potential driving voltage channel lines and the n second low-potential driving voltage channel lines;
   a liquid crystal layer filled between the lower substrate and the upper substrate; and
   a driving voltage supply configured to supply a driving voltage or a common voltage to the first electrodes and the second electrodes, to supply the driving voltage to the first electrodes and the common voltage to the second electrodes, or to supply the driving voltage to the second electrodes and the common voltage to the first electrodes,
   wherein none of the n first high-potential driving voltage channel lines and the n first low-potential driving voltage channel lines is extended parallel to a third side of the lower substrate in an area between the third side and the first electrodes, the third side being between the first side and the second side, and being opposite to a fourth side at which the driving voltage supply is located,
   wherein the n first high-potential driving voltage channel lines and the n second high-potential driving voltage channel lines are connected to the driving voltage supply via a first flexible printed circuit board and a second flexible printed circuit board, and
   wherein the first flexible printed circuit board is connected to the n first high-potential driving voltage channel lines at the fourth side of the lower substrate, and the second flexible printed circuit board is connected to the n second high-potential driving voltage channel lines at a third side of the upper substrate, the third side of the upper substrate being opposite to the fourth side of the lower substrate.

2. The stereoscopic image display device according to claim 1, further comprising a pad unit for connecting the n second high-potential driving voltage channel lines to the driving voltage supply via the second flexible printed circuit boards,
   wherein the pad unit includes:
   a plurality of dummy electrodes located on the lower substrate;
   a plurality of pad electrodes located on the upper substrate so as to be opposite the dummy electrodes; and
   a seal located between each of the dummy electrodes and a corresponding one of the pad electrodes, the seal comprising a conductive ball for electrically connecting respective ones of the dummy electrodes and the pad electrodes to each other, and wherein the second channel lines are connected to the pad electrodes.

3. The stereoscopic image display device according to claim 1, wherein none of the n first high-potential driving voltage channel lines is located on an edge of the second side, and
wherein none of the n first low-potential driving voltage channel lines is located on an edge of the first side.

4. The stereoscopic image display device according to claim 1, wherein
the driving voltage supply has 2n channels,
the n first high-potential driving voltage channel lines are connected to first to n-th channels of the driving voltage supply to supply the driving voltage or the common voltage to the first electrodes, and
the n second high-potential driving voltage channel lines are connected to (n+1)-th to 2n -th channels of the driving voltage supply to supply the driving voltage or the common voltage to the second electrodes.

5. The stereoscopic image display device according to claim 4, further comprising a sensor configured to sense a position of a viewer and to transmit position information to the driving voltage supply, wherein
the driving voltage supply is configured to determine the position of the viewer based on the position information received from the sensor, to supply the driving voltage to the first electrodes and the common voltage to the second electrodes when the viewer is at a first position having a first viewing distance, and to supply the driving voltage to the second electrodes and the common voltage to the first electrodes when the viewer is at a second position having a second viewing distance.

6. The stereoscopic image display device according to claim 4, wherein the second electrodes are opposite the first electrodes and are located on the upper substrate so as to be shifted leftward or rightward relative to the first electrodes on the lower substrate.

7. The stereoscopic image display device according to claim 1, wherein
the first electrodes are divided into a plurality of first unit electrode groups, each of which comprises n first electrodes,
the first electrodes of each first unit electrode group are sequentially connected to first to n-th channels of the driving voltage supply via the n first high-potential driving voltage channel lines,
the second electrodes are divided into a plurality of second unit electrode groups, and
the second electrodes of each second unit electrode group are sequentially connected to (n+1)-th to 2n-th channels of the driving voltage supply via the n second high-potential driving voltage channel lines.

8. The stereoscopic image display device according to claim 7, further comprising a first dielectric film on the n first high-potential driving voltage channel lines and the n first low-potential driving voltage channel lines, wherein the first electrodes are located on the first dielectric film, and the first electrodes are connected to the n first high-potential driving voltage channel lines and the n first low-potential driving voltage channel lines via a first contact hole.

9. The stereoscopic image display device according to claim 7, further comprising a second dielectric film under the n second high-potential driving voltage channel lines and the n second low-potential driving voltage channel lines, wherein, the second electrodes are located under the second dielectric film, and the second electrodes are connected to the second channel lines via a second contact hole.

10. The stereoscopic image display device according to claim 7, wherein a horizontal pitch of each first unit electrode group is different from a horizontal pitch of each second unit electrode group.

11. The stereoscopic image display device according to claim 1, wherein
adjacent ones among the first electrodes are located at different layers, and
adjacent ones among the second electrodes are located at different layers.

12. The stereoscopic image display device according to claim 11, further comprising a first passivation layer on the lower substrate, wherein odd-numbered ones and even-numbered ones of the first electrodes are spaced apart from each other in a state in which the first passivation layer is located therebetween.

13. The stereoscopic image display device according to claim 11, further comprising a second passivation layer located on the upper substrate, wherein odd-numbered ones and even-numbered ones of the second electrodes are spaced apart from each other in a state in which the second passivation layer is located therebetween.

14. The stereoscopic image display device according to claim 11, further comprising a first passivation layer located on the lower substrate and a third passivation layer located on the first passivation layer, wherein:
(3k−2)-th (k being a natural number) first electrodes are located between the lower substrate and the first passivation layer,
(3k−1)-th first electrodes are located between the first passivation layer and the third passivation layer, and
3k-th first electrodes are located on the third passivation layer.

15. The stereoscopic image display device according to claim 11, further comprising a second passivation layer located inside the upper substrate and a fourth passivation layer located under the second passivation layer, wherein:
(3j−2)-th (j being a natural number) second electrodes are located between the upper substrate and the second passivation layer,
(3j−1)-th second electrodes are located between the second passivation layer and the fourth passivation layer, and
3j-th second electrodes are located under the fourth passivation layer.

* * * * *